United States Patent
Nakano et al.

(10) Patent No.: US 9,598,584 B2
(45) Date of Patent: Mar. 21, 2017

(54) VISIBLE-LIGHT-RESPONSIVE PHOTOCATALYST POWDER, METHOD OF MANUFACTURING THE SAME, AND VISIBLE-LIGHT-RESPONSIVE PHOTOCATALYTIC MATERIAL, PHOTOCATALYTIC COATING MATERIAL AND PHOTOCATALYTIC PRODUCT EACH USING THE SAME

(75) Inventors: Kayo Nakano, Yokohama (JP); Akira Sato, Yokohama (JP); Yasuhiro Shirakawa, Yokohama (JP); Keiichi Fuse, Yokohama (JP); Masami Okamura, Yokohama (JP)

(73) Assignees: KABUSHIKI KAISHA TOSHIBA, Tokyo (JP); TOSHIBA MATERIALS CO., LTD., Yokohama-shi (JP)

( * ) Notice: Subject to any disclaimer, the term of this patent is extended or adjusted under 35 U.S.C. 154(b) by 646 days.

(21) Appl. No.: 12/676,097

(22) PCT Filed: Sep. 5, 2008

(86) PCT No.: PCT/JP2008/002453
§ 371 (c)(1),
(2), (4) Date: Mar. 2, 2010

(87) PCT Pub. No.: WO2009/031317
PCT Pub. Date: Mar. 12, 2009

(65) Prior Publication Data
US 2010/0204040 A1   Aug. 12, 2010

(30) Foreign Application Priority Data
Sep. 5, 2007   (JP) .................................. 2007-229697

(51) Int. Cl.
B01J 21/00   (2006.01)
B01J 23/00   (2006.01)
(Continued)

(52) U.S. Cl.
CPC ............ *C09D 5/1618* (2013.01); *B01J 23/30* (2013.01); *B01J 35/002* (2013.01); *B01J 35/004* (2013.01);
(Continued)

(58) Field of Classification Search
USPC ......................................... 502/305, 100, 300
See application file for complete search history.

(56) References Cited

U.S. PATENT DOCUMENTS 5,788,738 A * 8/1998 Pirzada .................. B01J 12/005
164/46
2005/0126428 A1* 6/2005 Lee .......................... C09D 1/00
106/1.21
(Continued)

FOREIGN PATENT DOCUMENTS

EP    1 857 179 A1    11/2007
JP    61-242902 A    10/1986
(Continued)

OTHER PUBLICATIONS

Lu et al., Synthesis of high surface area monoclinic WO3 particles using organic ligands and emulsion based methods, 2002, Journal of Materials Chemistry, 12, 983-989.*
(Continued)

*Primary Examiner* — James McDonough
(74) *Attorney, Agent, or Firm* — Foley & Lardner LLP

(57) ABSTRACT

A visible-light-responsive photocatalyst powder includes a tungsten oxide powder. When the tungsten oxide powder is measured by X-ray diffractometry, (1) among intensity ratios of a peak A ($2\theta=22.8$ to $23.4°$), a peak B ($2\theta=23.4$ to $23.8°$), a peak C ($2\theta=24.0$ to $24.25°$), and a peak D ($2\theta=24.25$ to $24.5°$), an A/D ratio and a B/D ratio each fall within a range of 0.5 to 2.0, and a C/D ratio falls within a range of 0.04 to 2.5, (2) an intensity ratio (E/F) of a peak E
(Continued)

(2θ=33.85 to 34.05°) to a peak F (2θ=34.05 to 34.25°) falls within a range of 0.1 to 2.0, and (3) an intensity ratio (G/H) of a peak G (2θ=49.1 to 49.7°) to a peak H (2θ=49.7 to 50.3°) falls within a range of 0.04 to 2.0, and the tungsten oxide powder has a BET specific surface area in a range of 1.5 to 820 m$^2$/g.

28 Claims, 6 Drawing Sheets

(51) Int. Cl.
| | |
|---|---|
| B01J 25/00 | (2006.01) |
| B01J 29/00 | (2006.01) |
| C09D 5/16 | (2006.01) |
| B01J 23/30 | (2006.01) |
| B01J 35/00 | (2006.01) |
| B01J 35/10 | (2006.01) |
| B01J 37/14 | (2006.01) |
| B01J 37/34 | (2006.01) |
| B82Y 30/00 | (2011.01) |
| C01G 41/02 | (2006.01) |
| C09D 1/00 | (2006.01) |
| C09D 5/14 | (2006.01) |
| C09D 7/12 | (2006.01) |
| D01F 1/10 | (2006.01) |
| D06M 11/48 | (2006.01) |
| C08K 3/22 | (2006.01) |

(52) U.S. Cl.
CPC ....... *B01J 35/1009* (2013.01); *B01J 35/1014* (2013.01); *B01J 35/1019* (2013.01); *B01J 37/14* (2013.01); *B01J 37/349* (2013.01); *B82Y 30/00* (2013.01); *C01G 41/02* (2013.01); *C09D 1/00* (2013.01); *C09D 5/14* (2013.01); *C09D 7/1216* (2013.01); *C09D 7/1266* (2013.01); *C09D 7/1275* (2013.01); *D01F 1/10* (2013.01); *D06M 11/48* (2013.01); *C01P 2002/72* (2013.01); *C01P 2002/74* (2013.01); *C01P 2004/62* (2013.01); *C01P 2004/64* (2013.01); *C01P 2006/12* (2013.01); *C01P 2006/62* (2013.01); *C01P 2006/63* (2013.01); *C01P 2006/64* (2013.01); *C01P 2006/80* (2013.01); *C08K 3/22* (2013.01); *Y10T 428/2982* (2015.01)

(56) References Cited

U.S. PATENT DOCUMENTS

| | | | |
|---|---|---|---|
| 2005/0163999 A1* | 7/2005 | Chonan | B82Y 30/00 428/402 |
| 2006/0008640 A1* | 1/2006 | Chonan | B32B 17/10018 428/328 |
| 2007/0177372 A1* | 8/2007 | Matsuda | B82Y 30/00 362/97.3 |
| 2008/0006954 A1 | 1/2008 | Yubuta et al. | |

FOREIGN PATENT DOCUMENTS

| | | |
|---|---|---|
| JP | 02-006339 A | 1/1990 |
| JP | 2001-152130 A | 6/2001 |
| JP | 2002-293544 A | 10/2002 |
| JP | 2003-215328 A | 7/2003 |
| JP | 2004-106303 A | 4/2004 |
| JP | 2006-102737 A | 4/2006 |
| JP | 2006-175685 A | 7/2006 |
| JP | 2006-297209 A | 11/2006 |
| JP | 2006-297350 A | 11/2006 |
| JP | 2006-312150 A | 11/2006 |
| JP | 2007-185605 A | 7/2007 |
| JP | 2008-168277 A | 7/2008 |
| WO | WO 2006/077839 A1 | 7/2006 |
| WO | WO 2007/088891 A1 | 8/2007 |
| WO | WO 2008/117655 A1 | 10/2008 |

OTHER PUBLICATIONS

Xian-Cai Li et al., "Preparation and Catalytic Applications of Ultrafine WO$_3$", China Tungsten Industry, vol. 18, No. 4, pp. 26-31.
K. Nakano, U.S. PTO Office Action, U.S. Appl. No. 12/676,099, dated Oct. 7, 2011, 12 pages.
K. Nakano, U.S. PTO Office Action, U.S. Appl. No. 12/676,099, dated Aug. 22, 2012, 12 pages.
B. Cole et al., "Evaluation of Nitrogen Doping of Tungsten Oxide for Photoelectrochemical Water Splitting", J. Phys. Chem., vol. 112 (2008), pp. 5213-5220.
Z. Lu et al., "Synthesis of high surface area monoclinic WO$_3$ particles using organic ligands and emulsion based methods", Journal of Materials Chemistry, vol. 12 (2002), pp. 983-989.
U.S. Appl. No. 12/676,099, filed Mar. 2, 2010, Nakano et al.
K. Ozawa et al., "Arc Plasm-ho ni yoru Kinzoku Sankabutsu Biryushi no Sakusei", The Ceramic Society of Japan Nenkai Koen Yokoshu, Mar. 22, 2003, p. 40.
M. Kurumada et al., "Structure of WO$_3$ ultrafine particles and their characteristic solid states", Journal of Crystal Growth, 2005, vol. 275, pp. 1673-1678.
G.R. Bamwenda et al., "The visible light induced photocatalytic activity of tungsten trioxide powders", Applied Catalysis A: General, 2001, vol. 210, Nos. 1, 2, pp. 181-191.
JIS R 1701-1, "Fine ceramics (advanced ceramics, advanced technical ceramics)—Test method for air purification performance of photocatalytic materials—Part 1: Removal of nitric oxide", Japanese Industrial Standard, and English Translation, 2004, 39 pages.
JIS Z 8729, "Colour specification—CIELAB and CIELUV colour spaces", Japanese Industrial Standard, 2004, 32 pages.
K. Nakano, U.S. PTO Office Action, U.S. Appl. No. 12/676,099, dated Apr. 23, 2013, 14 pages.
Shih-Han Wang, et al., "Nano-crystalline tungsten oxide NO$_2$ sensor", Sensors and Actuators B, vol. 94, 2003, pp. 343-351.
K. Nakano et al, U.S. PTO Official Action, U.S. Appl. No. 12/676,099, dated Feb. 11, 2014, 14 pages.
K. Nakano, U.S. PTO Official Action, U.S. Appl. No. 12/676,099, dated Apr. 23, 2015, 13 pages.
Nakano: US Office Action on U.S. Appl. No. 12/676,099 dated Jul. 1, 2016.

* cited by examiner

VISIBLE-LIGHT-RESPONSIVE PHOTOCATALYST POWDER, METHOD OF MANUFACTURING THE SAME, AND VISIBLE-LIGHT-RESPONSIVE PHOTOCATALYTIC MATERIAL, PHOTOCATALYTIC COATING MATERIAL AND PHOTOCATALYTIC PRODUCT EACH USING THE SAME

TECHNICAL FIELD

The present invention relates to a visible-light-responsive photocatalyst powder, a method of manufacturing the same, and visible-light-responsive photocatalytic material, photocatalytic coating material and photocatalytic product each using the same.

BACKGROUND ART

As a photocatalytic material used in the application for stain-proofing and deodorization, titanium oxide is known. The photocatalytic material is used in various fields of interior and exterior building materials, home appliances such as lighting devices, refrigerators, air-conditioners, and toilets. However, titanium oxide cannot exhibit sufficient photocatalytic performance in indoor environments having only a small amount of ultraviolet rays because titanium oxide is excited by an ultraviolet region. Therefore, research and development have been in progress for a visible-light-responsive photocatalyst exhibiting photocatalytic performance even by visible light.

As the visible-light-responsive photocatalyst, tungsten oxide is known. A patent document 1 describes a photocatalytic material made of tungsten oxide sputter-deposited on a base material, and tungsten oxide having a triclinic crystal structure is mainly used. Since the sputter deposition exposes the base material to high temperature, heat resistance temperature of some base material does not allow the application of the sputter deposition. Since the sputter deposition is often performed in a highly vacuum chamber, its process control is complicated, and it not only costs high depending on the shape and size of the base material but also has a difficulty in the deposition on a wide range such as on building materials. Moreover, though excellent in hydrophilic property, a visible-light-responsive photocatalytic layer made of sputter-deposited tungsten oxide has a problem that its performance of decomposing toxic gas such as acetaldehyde is not high enough.

The use of a tungsten oxide powder as a photocatalyst has been also studied. The tungsten oxide powder can be mixed with an organic binder to be applied on a base material, which eliminates the need to expose the base material to high temperature and makes it possible to form a coating film even on a wide range such as on building materials. As a method of manufacturing the tungsten oxide powder, there has been known a method of obtaining a tungsten trioxide ($WO_3$) powder by heating ammonium paratungstate (APT) in the air (see a patent document 2). The method of heating APT in the air provides a triclinic tungsten trioxide powder whose particle size is about 0.01 μm (BET specific surface area=82 $m^2/g$).

The tungsten trioxide ($WO_3$) powder generated by the heating of APT in the air needs to have fine particles in order to have improved photocatalytic performance. Applying a disintegration process can make the particle size small to some degree but has a difficulty in realizing the particle size of 100 nm or less, for instance. Moreover, turning it to fine powder by the use of the disintegration process causes a change in the crystal structure of the tungsten trioxide ($WO_3$) fine powder due to a stress by the disintegration process. Since the stress of the disintegration process causes a defect of the occurrence of the re-combination of electrons and holes, it is thought that photocatalytic performance is deteriorated. The manufacturing method described in the patent document 2 has a problem of low manufacturing efficiency of the tungsten trioxide powder since it requires 20 hour or more kneading in order to stabilize the BET specific surface area.

As a method of efficiently obtaining a fine powder, a patent document 3, for instance, describes a thermal plasma process. A fine powder whose particle size is 1 to 200 nm is obtained by the application of the thermal plasma process. The thermal plasma process can efficiently provide a fine powder, but even if the tungsten oxide fine powder produced by the use of the method described in the patent document 3 is used as a photocatalyst as it is, it is not always possible to obtain a sufficient photocatalytic property. It is thought that this is because the tungsten oxide fine powder produced by the thermal plasma method does not sometimes have an optimum optical property or crystal structure.

Tungsten oxide comes in various kinds such as $WO_3$ (tungsten trioxide), $WO_2$ (tungsten dioxide), WO, $W_2O_3$, $W_4O_5$, and $W_4O_{11}$. Among them, tungsten trioxide ($WO_3$) is mainly used as a photocatalytic material because of its excellent photocatalytic performance and its stability in a room-temperature atmosphere. However, tungsten trioxide ($WO_3$) has a disadvantage that its photocatalytic performance is not stable because of its complicated crystal structure and its changeability by a small stress. Moreover, even if having a stable crystal structure, tungsten trioxide ($WO_3$) cannot exhibit sufficient photocatalytic performance if its surface area is small.

Patent Document 1: JP-A 2001-152130 (KOKAI)
Patent Document 2: JP-A 2002-293544 (KOKAI)
Patent Document 3: JP-A 2006-102737 (KOKAI)

DISCLOSURE OF THE INVENTION

It is an object of the present invention to provide a visible-light-responsive photocatalyst powder excellent in photocatalytic performance and its reproducibility by improving and stabilizing visible light-exited photocatalytic performance of a tungsten oxide powder, a method of manufacturing the same, and visible-light-responsive photocatalytic material, photocatalytic coating material and photocatalytic product each using the same.

A visible-light-responsive photocatalyst powder according to an aspect of the present invention includes a tungsten oxide powder, wherein when the tungsten oxide powder is measured by X-ray diffractometry, (1) the tungsten oxide powder has first, second, and third peaks in 22.5 to 25° of 2θ range, and an intensity ratio of a peak A to a peak D (A/D) and an intensity ratio of a peak B to the peak D (B/D) each fall within a range of 0.5 to 2.0, and an intensity ratio of a peak C to the peak D (C/D) falls within a range of 0.04 to 2.5, where the peak A is a peak existing in 22.8 to 23.4° of 2θ range, the peak B is a peak existing in 23.4 to 23.8° of 2θ range, the peak C is a peak existing in 24.0 to 24.25° of 2θ range, and the peak D is a peak existing in 24.25 to 24.5° of 2θ range, (2) an intensity ratio of a peak E to a peak F (E/F) falls within a range of 0.1 to 2.0, where the peak E is a peak existing in 33.85 to 34.05° of 2θ range and the peak F is a peak existing in 34.05 to 34.25° of 2θ range, and (3) an intensity ratio of a peak G to a peak H (G/H) falls within a range of 0.04 to 2.0, where the peak G is a peak existing in 49.1 to 49.7° of 2θ range and the peak H is a peak existing in 49.7 to 50.3° of 2θ range, wherein the tungsten oxide powder has a BET specific surface area in a range of 1.5 to 820 m²/g.

A visible-light-responsive photocatalyst powder according to another mode of the present invention includes a tungsten oxide powder, wherein when the tungsten oxide powder is measured by X-ray diffractometry, (1) the tungsten oxide powder has first, second, and third peaks in 22.5 to 25° of 2θ range, and an intensity ratio of a peak A to a peak D (A/D) and an intensity ratio of a peak B to the peak D (B/D) each fall within a range of 0.5 to 2.0, and an intensity ratio of a peak C to the peak D (C/D) falls within a range of 0.04 to 2.5, where the peak A is a peak existing in 22.8 to 23.4° of 2θ range, the peak B is a peak existing in 23.4 to 23.8° of 2θ range, the peak C is a peak existing in 24.0 to 24.25° of 2θ range, and the peak D is a peak existing in 24.25 to 24.5° of 2θ range, (2) an intensity ratio of a peak E to a peak F (E/F) falls within a range of 0.1 to 2.0, where the peak E is a peak existing in 33.85 to 34.05° of 2θ range and the peak F is a peak existing in 34.05 to 34.25° of 2θ range, and (3) an intensity ratio of a peak G to a peak H (G/H) falls within a range of 0.04 to 2.0, where the peak G is a peak existing in 49.1 to 49.7° of 2θ range and the peak H is a peak existing in 49.7 to 50.3° of 2θ range, wherein an average particle size (D50) by image analysis of the tungsten oxide powder falls within a range of 1 to 548 nm.

A method of manufacturing a visible-light-responsive photocatalyst powder according to an aspect of the present invention includes sublimating a metal tungsten powder, a tungsten compound powder, or a tungsten compound solution in an oxygen atmosphere by applying at least one process selected from an inductively-coupled plasma process, an arc discharge process, a laser process, an electron beam process, and a gas burner process to manufacture a tungsten oxide powder.

A visible-light-responsive photocatalytic material according to an aspect of the present invention contains the visible-light-responsive photocatalyst powder according to the aspect of the present invention whose content in a range of not less than 1 mass % nor more than 100 mass %. A visible-light-responsive photocatalytic coating material according to an aspect of the present invention contains the visible-light-responsive photocatalytic material according to the aspect of the present invention in a range of not less than 0.1 mass % nor more than 90 mass %. A visible-light-responsive photocatalytic product of the present invention includes the visible-light-responsive photocatalytic material according to the aspect of the present invention, or a coating layer of the visible-light responsive photocatalytic coating material according to the aspect of the present invention.

BEST MODE FOR CARRYING OUT THE INVENTION

Hereinafter, an embodiment for carrying out the present invention will be described. A visible-light-responsive photocatalyst powder according to the embodiment of the present invention includes a tungsten oxide powder. When measured by X-ray diffractometry, the tungsten oxide powder composed of the visible-light-responsive photocatalyst powder satisfies the following conditions (1) to (3) and has a BET specific surface area falling within a 1.5 to 820 m²/g range. Alternatively, when measured by X-ray diffractometry, the tungsten oxide powder satisfies the following conditions (1) to (3) and an average particle size (D50) by image analysis thereof falls within a range of 1 to 548 nm.

(1) In an X-ray diffraction chart, the tungsten oxide powder has a first peak (a diffraction peak with the highest intensity among all peaks), a second peak (a diffraction peak with the second highest intensity), and a third peak (a diffraction peak with the third highest intensity) in 22.5 to 25° of 2θ range. Further, an intensity ratio of a peak A to a peak D (A/D) and an intensity ratio of a peak B to the peak D (B/D) each fall within a range of 0.5 to 2.0, and an intensity ratio of a peak C to the peak D (C/D) falls within a range of 0.04 to 2.5, where the peak A is a peak existing in 22.8 to 23.4° of 2θ range, the peak B is a peak existing in 23.4 to 23.8° of 2θ range, the peak C is a peak existing in 24.0 to 24.25° of 2θ range, and the peak D is a peak existing in 24.25 to 24.5° of 2θ range.

(2) In the X-ray diffraction chart, an intensity ratio of a peak E to a peak F (E/F) falls within a range of 0.1 to 2.0, where the peak E is a peak existing in 33.85 to 34.05° of 2θ range and the peak F is a peak existing in 34.05 to 34.25° of 2θ range.

(3) In the X-ray diffraction chart, an intensity ratio of a peak G to a peak H (G/H) falls within a range of 0.04 to 2.0, where the peak G is a peak existing in 49.1 to 49.7° of 2θ range and the peak H is a peak existing in 49.7 to 50.3° of 2θ range.

The measurement and analysis of the X-ray diffraction will be described. In the measurement of the X-ray diffraction, it is assumed that a Cu target and a Ni filter are used, only smoothing and background subtraction are performed so as to prevent the analysis from being influenced by a difference in processing condition, and peak intensities are measured without any Kα2 removal. Here, as for the way to read the peak intensities in the 2θ ranges in the X-ray diffraction chart, when a mountain is clearly seen, high positions of the mountain in this range are considered as peaks and heights of the peaks are read. When a mountain is not clearly seen but there are shoulders, the shoulder portions are considered as peaks in this range and heights of the shoulder portions are read. In a case of a gradient without any mountain or shoulder, heights at mid-points in this range are read and the read values are considered as the peak intensities in this range.

Figure 1:
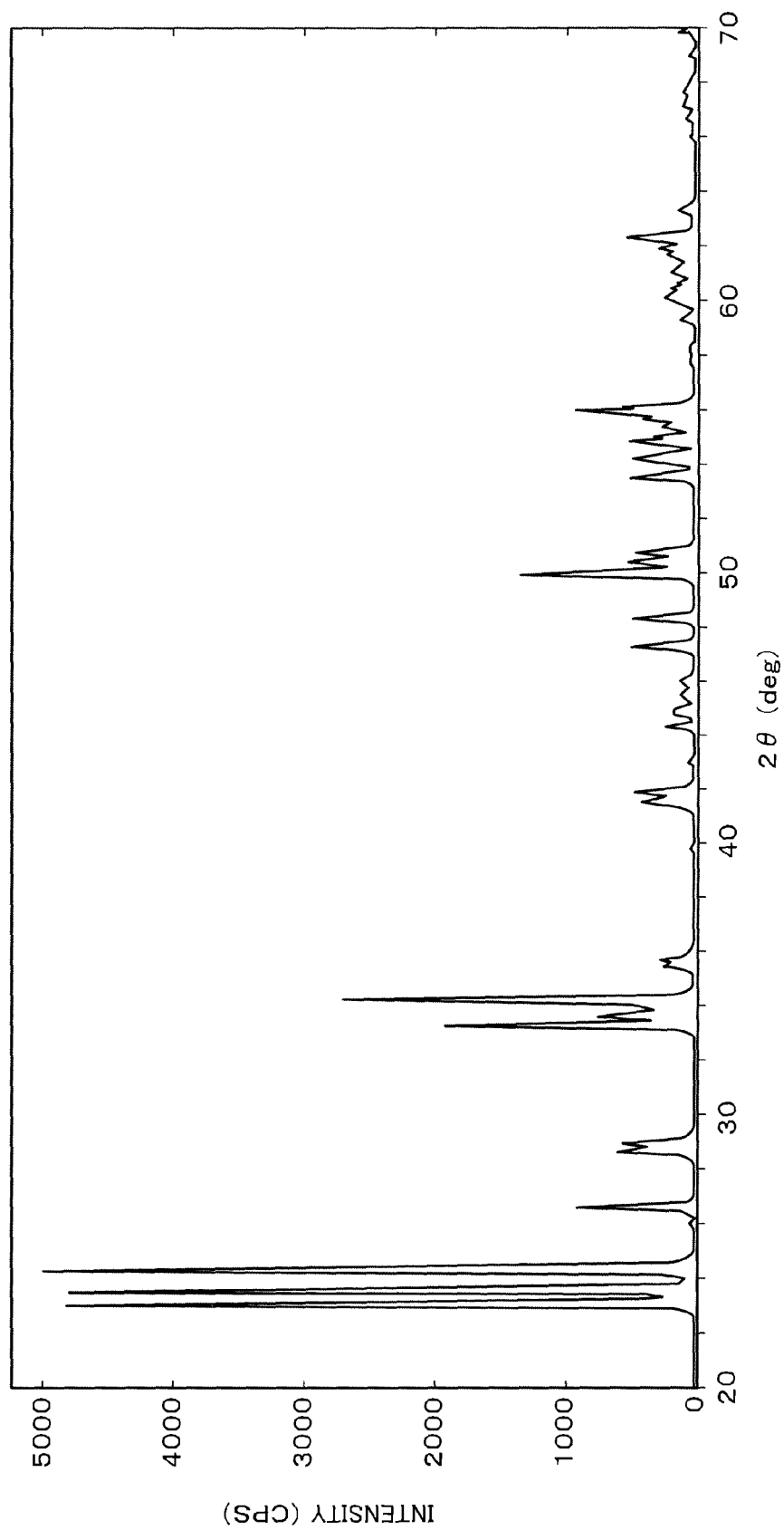
FIG. 1 is a chart showing the result of X-ray diffraction of a tungsten oxide powder according to a comparative example 1.
Figure 2:
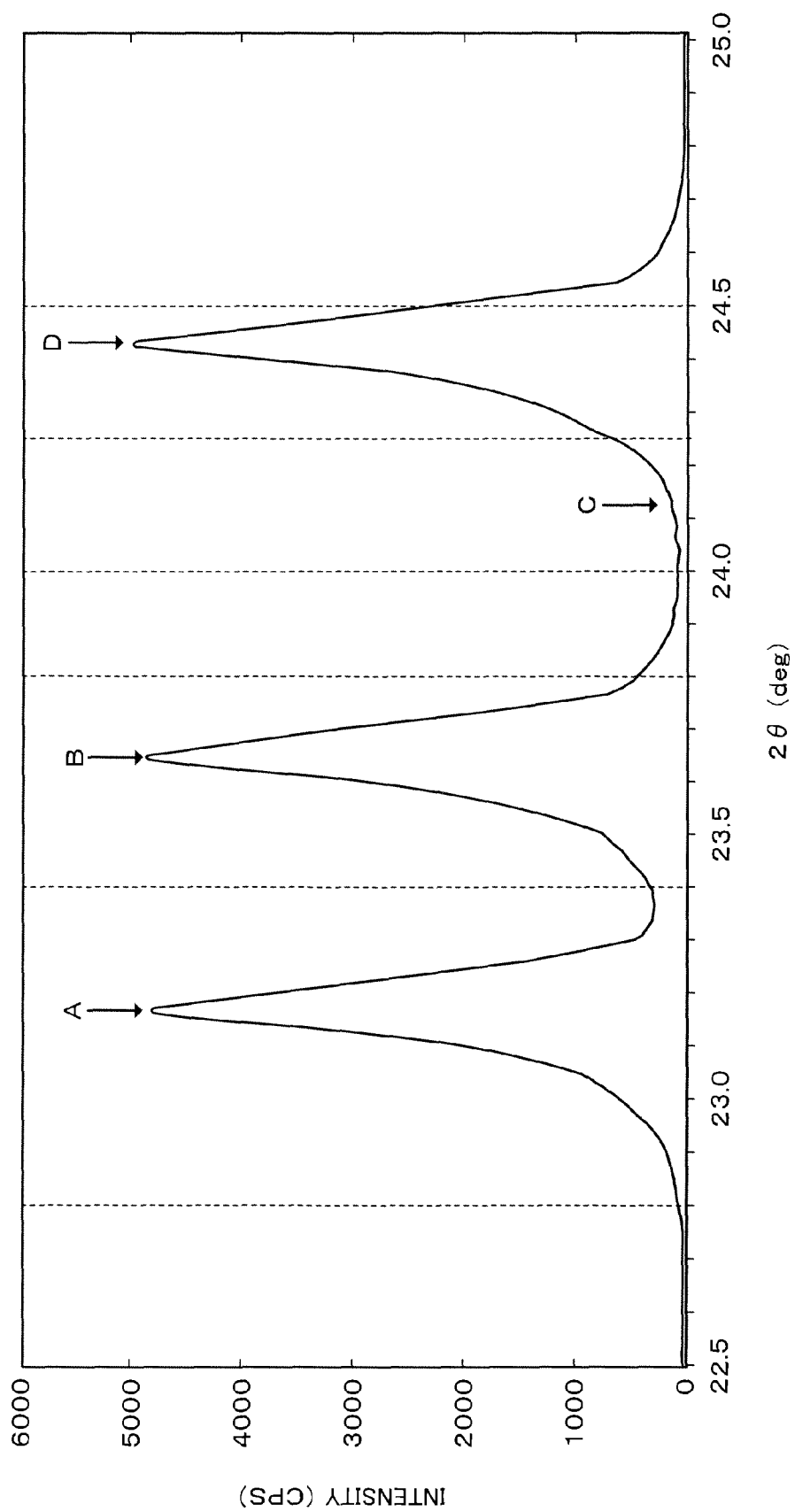
FIG. 2 is a chart showing an example of peaks A to D in the result of the X-ray diffraction.
Figure 3:
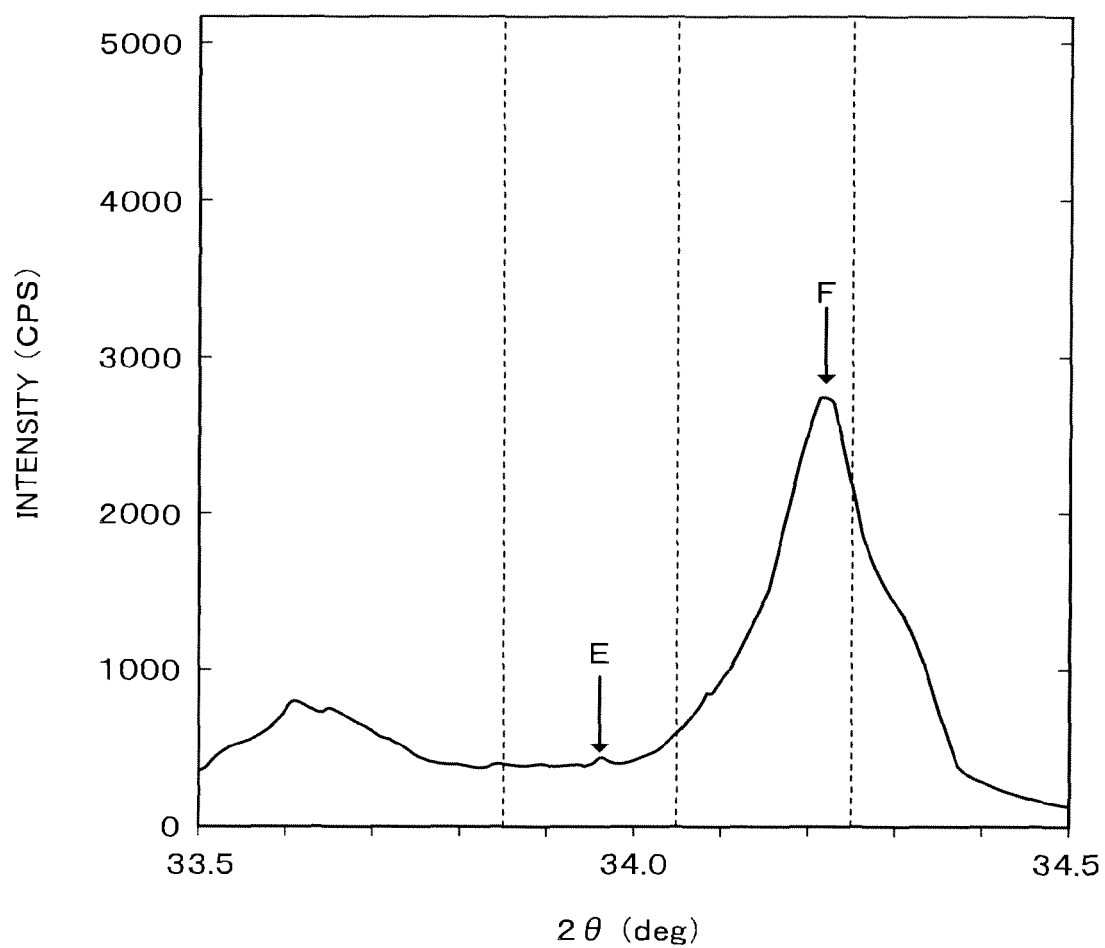
FIG. 3 is a chart showing an example of peaks E to F in the result of the X-ray diffraction.
Figure 4:
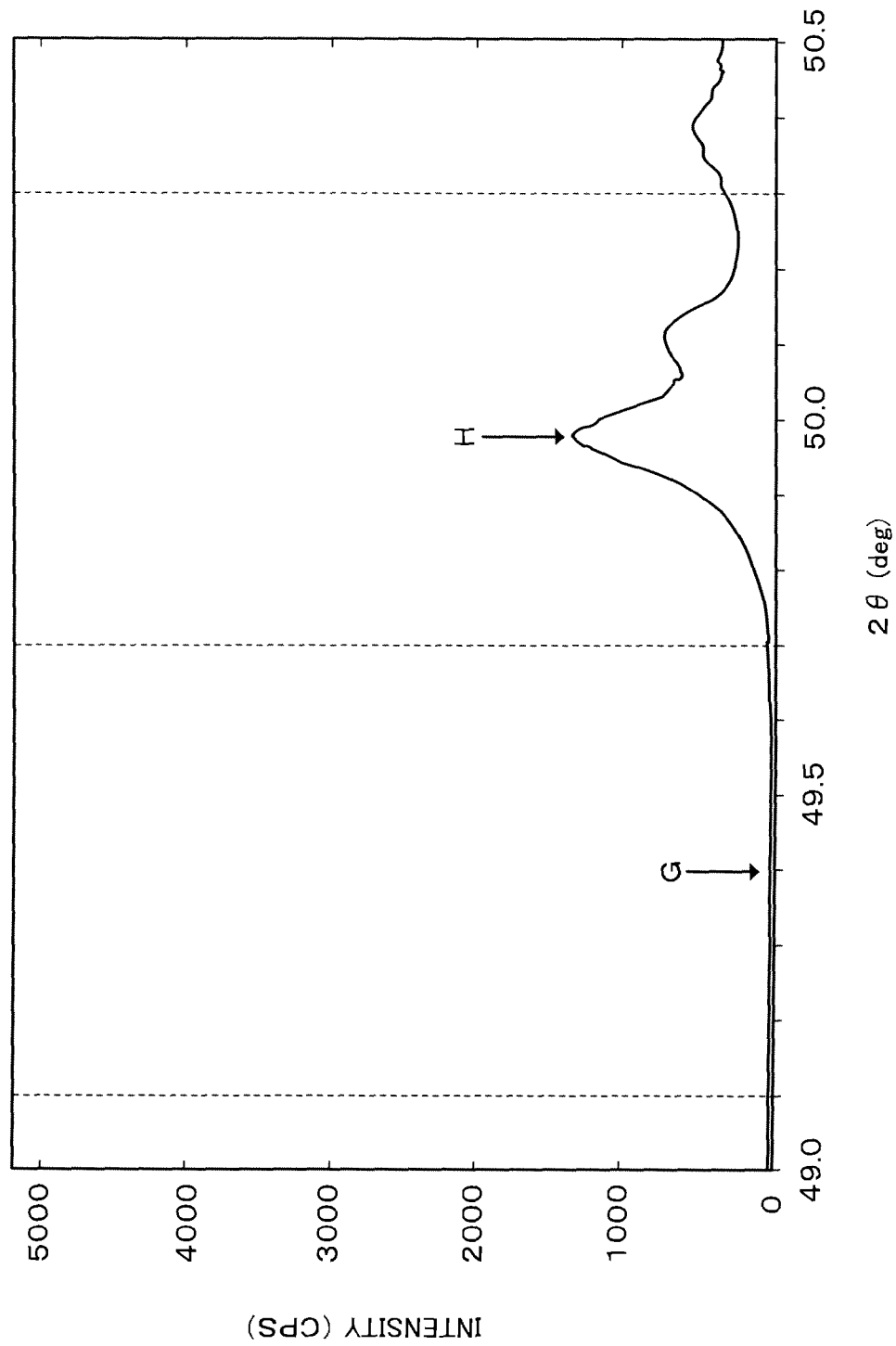
FIG. 4 is a chart showing an example of peaks G to H in the result of the X-ray diffraction.
Figure 5:
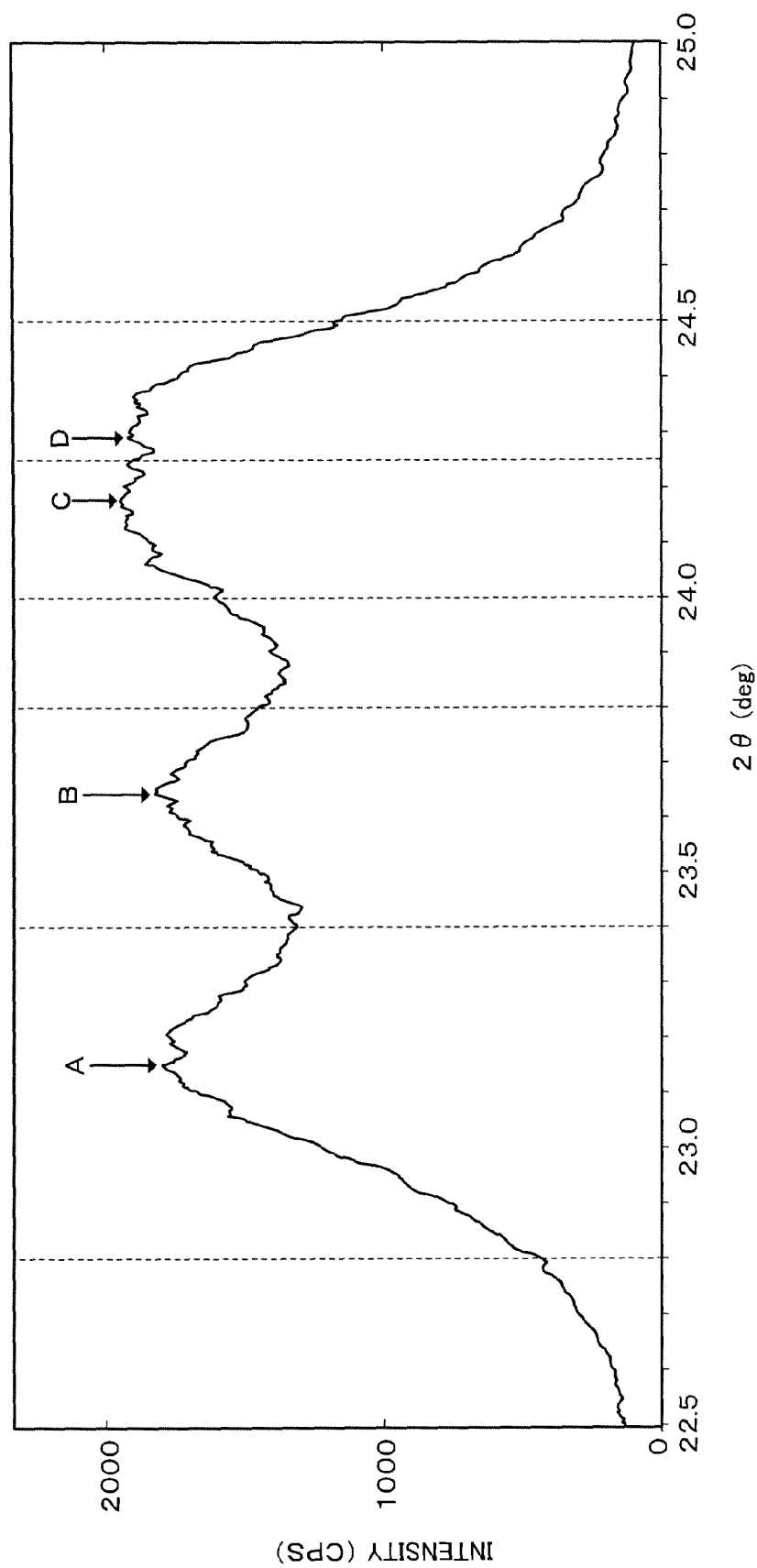
FIG. 5 is a chart showing another example of the peaks A to D in the result of the X-ray diffraction.

FIG. 1 shows a chart of X-ray diffraction of a tungsten oxide powder of a later-described comparative example 1, as an example of the result of X-ray diffraction of a tungsten oxide powder. FIG. 2 is a chart showing 22.5 to 25° of 2θ range in an enlarged manner and shows an example of the peaks A to D. FIG. 3 shows an example of the peaks E to F. FIG. 4 shows an example of the peaks G to H. FIG. 5 is a chart showing 22.5 to 25° of 2θ range in an enlarged manner similarly to FIG. 2 and shows how to read the peak C in a different pattern from that in FIG. 2.

It can be inferred that the tungsten oxide powder satisfying the conditions (1) to (3) is a mixed crystal in which at least one kind selected from a monoclinic crystal and a triclinic crystal is mixed with a rhombic crystal. It is inferred that mainly the monoclinic crystal, the triclinic crystal, or a mixed crystal of the monoclinic crystal and the triclinic crystal exists and the rhombic crystal is contained therein. The tungsten oxide powder having such a crystal structure can stably exhibit excellent photocatalytic performance. Though it is difficult to determine abundance ratios of the respective crystal phases, the tungsten oxide powder, when satisfying the conditions (1) to (3), can have improved photocatalytic performance and can exhibit such performance stably.

The tungsten oxide powder composed of the photocatalyst powder is mainly made of $WO_3$ (tungsten trioxide). Preferably, the tungsten oxide powder is substantially made of $WO_3$, but may contain another kind of oxide ($WO_2$, WO, $W_2O_3$, $W_4O_5$, $W_4O_{11}$, or the like). The tungsten oxide powder may be substantially made of $WO_3$, or may be a mixture of $WO_3$ as the main component and another oxide ($WO_x$). If the conditions (1) to (3) are satisfied, good photocatalytic performance can be obtained.

The 2θ range (22.5 to 25°) of the first, second and third peaks and the intensity ratios of the peaks (the peak A, the peak B, the peak C, and the peak D) existing in the respective 2θ ranges (22.8 to 23.4°, 23.4 to 23.8°, 24.0 to 24.25°, and 24.25 to 24.5° ranges) in the condition (1) are premises for the existence of the aforesaid mixed crystal. When the first, second, and third peaks fall out of the 22.5 to 25° of 2θ range, it indicates that a hetero-phase is appearing, and it is not possible to obtain the aforesaid mixed crystal state.

When the A/D ratio and the B/D ratio are less than 0.5 or are over 2.0, the balance of at least one kind selected from the monoclinic crystal and the triclinic crystal with the rhombic crystal deteriorates and sufficient photocatalytic performance cannot be obtained. Preferably, the A/D ratio and the B/D ratio each fall within a range of 0.7 to 2.0, and more preferably, within a range of 0.7 to 1.5. The A/D ratio and the B/D ratio each desirably fall within a range of 0.7 to 1.3.

The peak C, the peak D, and the C/D ratio in the condition (1), the peak E, the peak F, and the E/F ratio in the condition (2), and the peak G, the peak H, and the G/H ratio in the condition (3) indicate that the crystal structure of the tungsten oxide powder is a mixed crystal in which at least one selected from the monoclinic crystal and the triclinic crystal is mixed with the rhombic crystal and also indicate a mixture amount of the rhombic crystal. When the C/D ratio is less than 0.04, the E/F ratio is less than 0.1, or the G/H ratio is less than 0.04, it is inferred that the crystal structure is a single phase or the rhombic crystal is not appearing. When the C/D ratio is over 2.5, the E/F ratio is over 2.0, or the G/H ratio is over 2.0, it is inferred that the crystal structure is a single phase or the rhombic crystal has an excessive amount. In any of the cases, sufficient photocatalytic performance cannot be obtained.

The C/D ratio in the condition (1) preferably falls within a range of 0.5 to 2.5, and more preferably, within a range of 0.5 to 1.5. The C/D ratio desirably falls within a range of 0.7 to 1.1. The E/F ratio in the condition (2) preferably falls within a range of 0.5 to 2.0, and more preferably, within a range of 0.5 to 1.5. The E/F ratio desirably falls within a range of 0.7 to 1.1. The G/H ratio in the condition (3) preferably falls within a range of 0.2 to 2.0, and more preferably, within a range of 0.2 to 1.5. The G/H ratio desirably falls within a range of 0.4 to 1.1. When these conditions are satisfied, it is possible to improve a photocatalytic reaction of the tungsten oxide powder by visible light with higher reproducibility.

The photocatalytic performance of the tungsten oxide powder can be improved not only by the aforesaid crystal structure. Specifically, when a tungsten oxide powder satisfying the conditions (1) to (3) and having a BET specific surface area in a range of 1.5 to 820 $m^2/g$ is used as a visible-light-responsive photocatalyst powder, it is possible to stably obtain excellent photocatalytic performance. Assuming that a specific gravity of tungsten oxide is 7.3, an average particle size converted from the BET specific surface area falls within a range of 1 to 548 nm.

Further, when a tungsten oxide powder satisfying the conditions (1) to (3) and having an average particle size in a range of 1 to 548 nm is used as a visible-light-responsive photocatalyst powder, it is possible to stably obtain excellent photocatalytic performance. Here, it is assumed that the average particle size is calculated based on an average particle size of particles in number n=50 (D50) by image analysis of a photograph of SEM, TEM, or the like. The average particle size (D50) may be equal to the average particle size converted from the specific surface area.

The larger the specific surface area and the smaller the particle size, the higher the performance of the photocatalyst powder. Therefore, when the BET specific surface area is less than 1.5 $m^2/g$ (the average particle size is over 548 nm), sufficient photocatalytic performance cannot be obtained even when the tungsten oxide powder satisfies the conditions (1) to (3). When the BET specific surface area of tungsten oxide is over 820 $m^2/g$ (the average particle size is less than 1 nm), practicability is lowered because handlability as powder deteriorates.

The BET specific surface area of the tungsten oxide powder preferably falls within in a range of 11 to 300 $m^2/g$, and more preferably, within a range of 16 to 150 $m^2/g$. The BET specific surface area desirably falls within a range of 20 to 100 $m^2/g$. The average particle size by image analysis of the tungsten oxide powder preferably falls within a range of 2.5 to 75 nm, and more preferably, within a range of 5.5 to 51 nm. The average particle size by image analysis desirably falls within a range of 8.2 to 41 nm. When the tungsten oxide powder is applied to a visible-light-responsive photocatalytic coating material, too small a particle size results in poor dispersibility of particles and results in a difficulty in turning it into the coating material. To solve such problems, a tungsten oxide powder whose particle size is 8.2 nm or more is preferably used.

The visible-light-responsive photocatalyst powder of this embodiment includes the tungsten oxide powder which has the crystal structure shown in the conditions (1) to (3) based on the result of the X-ray diffraction, a BET specific surface area falling within a range of 1.5 to 820 $m^2/g$, and/or an average particle size (D50) falling within a range of 1 to 548 nm. Using the tungsten oxide powder satisfying these conditions makes it possible to provide a visible-light-responsive photocatalyst powder whose photocatalytic performance by visible light excitation is improved.

Further, the tungsten oxide powder composed of the visible-light-responsive photocatalyst powder preferably has color whose a* is 0 or less, b* is −5 or more, and L* is 50 or more when the color of the powder is expressed by the L*a*b* color system (L-star/a-star/b-star color system). The L*a*b* color system is a method used to express color of an object and is standardized by Commission Internationale de l'Eclairage (CIE) in 1976, and its definition is in JIS Z-8729 in Japan. L* expresses lightness and a* and b* express hue and saturation. The larger *L is, the higher lightness is expressed. a* and b* express the directions of color, a* expressing a red direction, −a* expressing a green direction, b* expressing a yellow direction, and −b* expressing a blue direction. Saturation is expressed by $(c^*)=((a^*)^2+(b^*)^2)^{1/2}$.

The tungsten oxide powder preferably has color whose a* is 0 or less, *b is −5 or more, and L* is 50 or more, and more preferably has color whose a* is −5 or less, b* is 5 or more, and L* is 70 or more. Desirably, a*, b*, and L* which express color tone of the tungsten oxide powder fall within a range of −25 to −8, a range of 10 to 45, and is 85 or more respectively.

The aforesaid numerical values of the L*a*b* color system indicate that the tungsten oxide powder has a hue from yellow to the vicinity of green and has high saturation and lightness. When it has such an optical property, its photocatalytic performance by visible light excitation can be improved. The color tone of the tungsten oxide powder is thought to change based on composition fluctuation due to oxygen deficiency, light irradiation, and so on, and when it has the above-described hue, saturation, and lightness, good photocatalytic performance can be obtained. When it has a hue close to blue, it is thought that there is a high degree of oxygen deficiency or the like, and with such a hue, the deterioration in the photocatalytic performance is observed.

The tungsten oxide powder composed of the visible-light-responsive photocatalyst powder may contain a trace amount of a metal element as impurities. The content of the metal element as the impurity element is preferably 10 mass % or less. In order to suppress a change in the color tone of the tungsten oxide powder, the content of the impurity metal element is desirably 2 mass % or less. Examples of the impurity metal element are an element normally contained in a tungsten mineral and a contaminant element which is mixed when a tungsten compound or the like used as a raw material is produced. Concrete examples of the impurity metal element are Fe, Mo, Mn, Cu, Ti, Al, Ca, Ni, Cr, Mg, and the like.

The nitrogen content of the tungsten oxide powder composed of the visible-light-responsive photocatalyst powder is preferably 300 ppm or less (mass ratio). The smaller an amount of the impurities in the tungsten oxide powder, the better. In particular, since nitrogen is a factor causing the deterioration in crystallinity of the tungsten oxide powder, its content is preferably 300 ppm or less. It is thought that, when the nitrogen content is 300 ppm or less, crystallinity improves, which makes it difficult for the re-combination of electrons and holes to occur. The nitrogen content of the tungsten oxide powder is more preferably 150 ppm or less.

In the visible-light-responsive photocatalyst powder of this embodiment, the control of the crystal structure and the use of the tungsten oxide powder having a large specific surface area (having a small average particle size) make it possible to improve and stabilize the photocatalytic performance by visible light excitation. Further, controlling the color of the tungsten oxide powder and the content of the impurity element such as nitrogen enables further improvement in photocatalytic performance. The tungsten oxide powder of this embodiment is excellent in dispersibility since its zeta potential in an aqueous solution with pH 1 to 7 is minus, and thus can be applied thinly and evenly on a base material.

Examples of the photocatalytic performance are performance of decomposing organic gas such as acetaldehyde and formaldehyde, a hydrophilic property, antibacterial performance, and disinfection performance. Here, visible light is light in a 390 to 830 nm wavelength range. The tungsten oxide powder of this embodiment has excellent photocatalytic performance when irradiated with 430 to 500 nm light. Examples of an excitation source emitting light with a 430 to 500 nm wavelength are sunlight, a fluorescent lamp, a blue-emitting diode, a blue laser, and the like. In particular, the blue-emitting diode and the blue laser are preferable since they can emit only light with a 430 to 500 nm wavelength.

The tungsten oxide powder composed of the visible-light-responsive photocatalyst powder of the embodiment is manufactured as follows, for instance. The tungsten oxide powder is manufactured by the use of a sublimation process. Combining a heat treatment process with the sublimation process is also effective. According to the tungsten trioxide powder manufactured by the use of the sublimation process or the combination of the sublimation process and the heat treatment process, it is possible to stably realize the aforesaid crystal structure and BET specific surface area. Further, when the powder is evaluated by SEM or TEM, the average particle size of primary particles approximates a value converted from the BET specific surface area, and it is possible to stably provide a powder small in particle size variation.

First, the sublimation process will be described. The sublimation process is a process to obtain a tungsten trioxide powder by sublimating a metal tungsten powder, a tungsten compound powder, or a tungsten compound solution in an oxygen atmosphere. Sublimation is a phenomenon in which a state change from a solid phase to a vapor phase or from a vapor phase to a solid phase occurs not through a liquid phase. By oxidizing the metal tungsten powder, the tungsten compound powder, or the tungsten compound solution as a raw material while sublimating it, it is possible to obtain a tungsten oxide powder in a fine powder state.

As the raw material of the sublimation process (tungsten raw material), any of the metal tungsten powder, the tungsten compound powder, and the tungsten compound solution may be used. Examples of the tungsten compound used as the raw material are tungsten trioxide ($WO_3$), tungsten dioxide ($WO_2$), tungsten oxide such as low-grade oxide, tungsten carbide, ammonium tungstate, calcium tungstate, tungstic acid, and the like.

By the sublimation process of the above-described tungsten raw material in the oxygen atmosphere, the metal tungsten powder or the tungsten compound powder is instantaneously changed from a solid phase to a vapor phase, and oxidizing metal tungsten vapor changed to the vapor phase results in a tungsten oxide powder. When a solution is used, it also changes to a vapor phase through a tungsten oxide or compound. By thus using an oxidation reaction in the vapor phase, it is possible to obtain a tungsten oxide fine powder. The crystal structure of the tungsten oxide fine powder can be controlled.

As the raw material of the sublimation process, it is preferable to use at least one selected from a metal tungsten powder, a tungsten oxide powder, a tungsten carbide powder, and an ammonium tungstate powder since the tungsten oxide powder obtained by the sublimation in the oxygen atmosphere is less likely to contain impurities. The metal tungsten powder and the tungsten oxide powder are especially preferable as the raw material of the sublimation process since they do not contain a toxic substance as a byproduct (substance other than tungsten oxide) produced in the sublimation.

As the tungsten compound used as the raw material, a compound containing tungsten (W) and oxygen (O) as its constituent elements is preferable. The tungsten compound containing W and O as its components is easily sublimated instantaneously when a later-described inductively-coupled plasma process is applied in the sublimation process. Examples of such a tungsten compound are $WO_3$, $W_{20}O_{58}$, $W_{18}O_{49}$, $WO_2$, and the like. Solutions, salts, or the like of tungstic acid, ammonium paratungstate, ammonium metatungstate are also effective.

The metal tungsten powder or the tungsten compound powder as the tungsten raw material preferably has an average particle size falling within a 0.1 to 100 μm range. The average particle size of the tungsten raw material more preferably falls within a 0.3 μm to 10 μm range, still more preferably, within a 0.3 μm to 3 μm range, and desirably within a 0.3 μm to 1.5 μm range. When the metal tungsten powder or the tungsten compound powder having the average particle size in the above range is used, the sublimation easily occurs.

When the average particle size of the tungsten raw material is less than 0.1 μm, the powder of the raw material is too fine, and thus advance adjustment of the raw material powder is required and handlability is lowered, and in addition, high cost is required, which is not industrially preferable. When the average particle size of the tungsten raw material is over 100 μm, a uniform sublimation reaction is difficult to occur. Even if the average particle size is large, processing with a large energy amount can cause a uniform sublimation reaction, but this is not industrially preferable.

As a method of sublimating the tungsten raw material in the oxygen atmosphere in the sublimation process, at least one kind of process selected from an inductively-coupled plasma process, an arc discharge process, a laser process, an electron beam process, and a gas burner process is possible. Among them, in the laser process and the electron beam process, the sublimation process is performed by the irradiation of a laser beam or an electron beam. Since the laser beam and the electron beam each have a small irradiation spot diameter, they need a long time to process a large amount of the raw material at a time, but have an advantage that there is no need to strictly control the particle size of the raw material powder and stability of its supply amount.

The inductively-coupled plasma process and the arc discharge process can cause an oxidation reaction of a large amount of the raw material powder at a time in an oxygen atmosphere though requiring the adjustment of a generation area of plasma or arc discharge. Moreover, an amount of the raw material processable at a time can be controlled. The gas burner process has a difficulty in processing a large amount of the raw material powder or the raw material solution though requiring a small motive power expense. Therefore, the gas burner process is inferior in productivity. A gas burner may be any having an energy high enough to cause the sublimation, and is not particularly limited. A propane gas burner, an acetylene gas burner, or the like is used.

When the inductively-coupled plasma process is applied to the sublimation process, a generally used method is a method in which plasma is generated by using argon gas or oxygen gas and a metal tungsten powder or a tungsten compound powder is supplied to the plasma. A method of supplying the tungsten raw material into the plasma is, for example, a method of injecting a metal tungsten powder or a tungsten compound powder together with carrier gas, a method of injecting a dispersion liquid in which the metal tungsten powder or the tungsten compound powder is dispersed in a predetermined liquid dispersion medium, or the like.

The carrier gas used when the metal tungsten powder or the tungsten compound powder is injected into the plasma is, for example, air, oxygen, inert gas containing oxygen, or the like. Among them, air is preferably used because of its low cost. When a reaction field contains a sufficient amount of oxygen such as a case where reaction gas containing oxygen is injected besides the carrier gas or a case where the tungsten compound powder is tungsten trioxide, inert gas such as argon or helium may be used as the carrier gas. As the reaction gas, the use of oxygen or inert gas containing oxygen is preferable. When the inert gas containing oxygen is used, an oxygen amount is preferably set so that a sufficient amount of oxygen necessary for the oxidation reaction can be supplied.

Applying the method of injecting the metal tungsten powder or the tungsten compound powder with the carrier gas and adjusting a gas flow rate and the pressure in a reaction vessel facilitate the control of the crystal structure of the tungsten trioxide powder. Concretely, it is easy to obtain the tungsten trioxide powder having the crystal structure in which at least one kind selected from the monoclinic crystal and the triclinic crystal (the monoclinic crystal, the triclinic crystal, or the mixed crystal of the monoclinic crystal and the triclinic crystal) is mixed with the rhombic crystal. In order to simultaneously control the specific surface area (particle size) and the crystal structure of the tungsten trioxide powder, it is necessary to adjust the power of the plasma, the kind of gas, gas balance, the gas flow rate, the pressure in the reaction vessel, a supply amount of the raw material powder, and so on. Each of these values cannot be decided to a single value because the property varies depending on how these parameters are combined.

The dispersion medium used in the preparation of the dispersion liquid of the metal tungsten powder or the tungsten compound powder is a liquid dispersion medium having oxygen atoms in its molecules, or the like. Using the dispersion liquid facilitates handling of the raw material powder. As the liquid dispersion medium having oxygen atoms in its molecules, that containing 20 vol. % or more of at least one kind selected from water and alcohol is used, for instance. As alcohol used as the liquid dispersion medium, at least one kind selected from methanol, ethanol, 1-propanol, and 2-propanol is preferable, for instance. Water and alcohol do not obstruct the sublimation reaction and the oxidation reaction of the raw material powder because of their easy volatility by heat of plasma, and easily promote the oxidation reaction because they contain oxygen in its molecules.

When the dispersion liquid is prepared by dispersing the metal tungsten powder or the tungsten compound powder in the dispersion medium, it is preferable that the dispersion liquid contains the metal tungsten powder or the tungsten compound powder in a range of 10 to 95 mass, and more preferably, in a range of 40 to 80 mass % range. By setting the dispersion amount in the dispersion liquid to such a range, it is possible to uniformly disperse the metal tungsten powder or the tungsten compound powder in the dispersion liquid. The uniform dispersion facilitates the uniform occurrence of the sublimation reaction of the raw material powder. If the content in the dispersion liquid is less than 10 mass %, an amount of the raw material powder is too small and efficient manufacture is not possible. If the content is over 95 mass %, the raw material powder has an increased viscosity due to a small amount of the dispersion liquid and thus easily sticks to the vessel, which lowers handlability.

Applying the method of dispersing the metal tungsten powder or the tungsten compound powder in the dispersion liquid and injecting the dispersion liquid into the plasma facilitates controlling the crystal structure of the tungsten trioxide powder. Concretely, it is easy to obtain the tungsten trioxide powder having the crystal structure in which the rhombic crystal is mixed with at least one kind selected from the monoclinic crystal and the triclinic crystal. Further, using the tungsten compound solution as the raw material also enables a uniform sublimation reaction and improves controllability of the crystal structure of the tungsten trioxide powder. The method of using the dispersion liquid as described above is also applicable to the arc discharge process.

When the sublimation process is performed by the irradiation of a laser beam or an electron beam, it is preferable to use the metal tungsten or the tungsten compound in a pellet form as the raw material. Since the laser beam and the electron beam each have a small irradiation spot diameter, the use of the metal tungsten powder or the tungsten compound powder makes the supply difficult, but using the metal tungsten or tungsten compound in a pellet form enables efficient sublimation. The laser may be any having an energy high enough to sublimate the metal tungsten or the tungsten compound and is not particularly limited, but a $CO_2$ laser is preferable because of its high energy.

When the pellet is irradiated with the laser beam or the electron beam, moving at least one of an irradiation source of the laser beam or the electron beam and the pellet enables effective sublimation of the whole surface of the pellet having a certain degree of size. This makes it easy to obtain the tungsten trioxide powder having the crystal structure in which the rhombic crystal is mixed with at least one kind selected from the monoclinic crystal and the triclinic crystal. The pellet is also applicable to the inductively-induced plasma process and the arc discharge process.

In order to simultaneously control the specific surface area (particle size) and the crystal structure of the tungsten trioxide powder, it is necessary to adjust the power of the laser beam or the electron beam, the kind of atmosphere gas, gas balance, the gas flow rate, the pressure in the reaction vessel, the density of the pellet, a moving speed of an irradiation spot, and so on. Each of these values cannot be decided to a single value because the property varies depending on how these parameters are combined. When the gas burner process is performed, it is necessary to adjust the power of a gas burner, the kind of atmosphere gas, gas balance, the gas flow rate, the pressure in the reaction vessel, a feeding speed of the raw material, and so on. Each of these values cannot be decided to a single value because the property varies depending on how these parameters are combined.

The tungsten oxide powder composed of the visible-light-responsive photocatalyst powder of this embodiment can be obtained only by the sublimation process, but it is also effective to subject the tungsten oxide powder produced by the sublimation process to a heat treatment process. In the heat treatment process, the tungsten trioxide powder obtained by the sublimation process is heat-treated in an oxide atmosphere at a predetermined temperature and for a predetermined time. Even when a sufficient amount of the tungsten trioxide fine powder cannot be formed by controlling the conditions of the sublimation process, performing the heat treatment makes it possible to make a ratio of the tungsten trioxide fine powder in the tungsten oxide powder 99% or more, or practically 100%. Further, the heat treatment process can adjust the crystal structure of the tungsten trioxide fine powder to a predetermined structure.

Examples of the oxide atmosphere used in the heat treatment are air and oxygen-containing gas. The oxygen-containing gas means inert gas containing oxygen. The heat treatment temperature preferably falls within a range of 300 to 1000° C., and more preferably, within a range of range of 500 to 700° C. The heat treatment time is preferably 10 minutes to two hours, and more preferably 30 minutes to 1.5 hours. Making the temperature and the time of the heat treatment process fall within the aforesaid ranges facilitates forming tungsten trioxide from tungsten oxide except tungsten trioxide.

When the heat treatment temperature is lower than 300°, there is a possibility that it is not possible to obtain a sufficient oxidation effect for turning the powder, which has not been turned into tungsten trioxide in the sublimation process, into tungsten trioxide. When the heat treatment temperature is higher than 1000° C., the tungsten oxide fine particles rapidly grow and accordingly the specific surface area of the resultant tungsten oxide fine powder is likely to decrease. Further, by performing the heat treatment process at the aforesaid temperature and for the aforesaid time, it is possible to adjust the crystal structure of the tungsten trioxide fine powder.

In order to improve photocatalytic performance and a product property, for example, gas decomposition performance and antibacterial performance, the tungsten oxide powder may contain a transition metal element. The content of the transition metal element is preferably 50 mass % or less. When the content of the transition metal element is over 50 mass %, the property as the visible-light-responsive photocatalyst powder may possibly deteriorate. The content of the transition metal element is preferably 10 mass % or less, and more preferably 2 mass % or less.

The transition metal element is any of elements whose atomic numbers are 21 to 29, 39 to 47, 57 to 79, and 89 to 109 respectively. Among them, the use of at least one kind selected from Ti, Fe, Cu, Zr, Ag, and Pt is preferable. Examples of a form of the contained transition metal element are metal, an oxide, a complex oxide, a compound, and the like. The transition metal element may be mixed with the tungsten oxide powder, or the transition metal element may carry the tungsten oxide powder. The transition metal element with tungsten may form a compound.

The visible-light-responsive photocatalyst powder of this embodiment is usable as a visible-light-responsive photocatalyst as it is. Alternatively, a powder (or substance in a form other than powder) obtained by mixing the visible-light-responsive photocatalyst powder with another material or by having the other material carry it, or by impregnating the other material with it can be used as the visible-light-responsive photocatalyst. A visible-light-responsive photocatalytic material of this embodiment contains the visible-light-responsive photocatalyst powder whose content falls within a 1 to 100 mass % range.

The content of the photocatalyst powder in the visible-light-responsive photocatalytic material is appropriately selected according to a desired property, but if it is less than 1 mass %, sufficient photocatalytic performance cannot be obtained. The visible-light-responsive photocatalyst powder (tungsten oxide powder) may be mixed with particles of $SiO_2$, $ZrO_2$, $Al_2O_3$, $TiO_2$, or the like, for instance, or may be carried by these particles. Further, zeolite or the like may be impregnated with tungsten oxide.

The visible-light-responsive photocatalyst powder of this embodiment mixed with a solvent, an additive, or the like is used as a visible-light-responsive photocatalytic coating material. As a main component of the photocatalytic coating material, the above-described visible-light-responsive photocatalytic material may be used instead of the visible-light-responsive photocatalyst powder. The content of the photocatalyst powder or the photocatalytic material in the visible-light-responsive photocatalytic coating material is set so as to fall within a range of 0.1 to 90 mass %. When the content of the photocatalyst powder or the photocatalytic material is less than 0.1 mass %, sufficient photocatalytic performance cannot be obtained, and when it is over 90 mass %, the property as the coating material lowers.

The solvent or the additive blended in the visible-light-responsive photocatalytic coating material is water, alcohol, a dispersing agent, a binder, or the like. The binder may be any of an inorganic binder, an organic binder, and an organic-inorganic complex binder. The inorganic binder is, for example, colloidal silica, alumina sol, zirconia sol, or the like. The organic-inorganic complex binder means an organic matter containing a metal element such as Si as its component. As an organic component of the organic binder or the organic-inorganic complex binder, silicone resin or the like is used.

The visible-light-responsive photocatalytic coating material is used in various kinds of products. Concrete examples of the visible-light-responsive photocatalytic coating material include various kinds of glass coating agents such as a coating agent for automobile glass and a coating agent for bathroom glass, a bathroom coating agent, coating agents for toilet and wash room, an interior coating material, an electric appliance coating material, and the like. Besides, the photocatalytic coating material is also effective for various kinds of products requiring gas decomposition performance, antibacterial performance, and the like.

A visible-light-responsive photocatalytic product according to an embodiment of the present invention includes the visible-light-responsive photocatalyst powder or photocatalytic material described above. Alternatively, the photocatalytic product includes a coating layer of the photocatalytic coating material. The photocatalytic product is, for example, a product in which the photocatalyst powder or the photocatalytic material is made to adhere to a base material or the base material is impregnated therewith or a product in which the photocatalytic coating material is applied on the base material. The photocatalytic products include products containing zeolite, activated carbon, porous ceramics, or the like impregnated with the photocatalyst powder.

Concrete examples of the visible-light-responsive photocatalytic product include an air-conditioner, an air cleaner, an electric fan, a refrigerator, a microwave oven, a dishwasher/drier, a rice cooker, a pot, an IH heater, a washing machine, a vacuum cleaner, a lighting fixture (lamp, fixture main body, shade, or the like) sanitary goods, a lavatory bowl, a wash basin, a mirror, a bathroom (wall, ceiling, floor, and so on), building materials (indoor wall, ceiling material, floor, exterior wall), interior goods (curtain, carpet, table, chair, sofa, shelf, bed, bedding, and the like), glass, metal sash window, handrail, door, knob, clothes, filter used in home electric appliances, and the like.

Examples of the base material of the visible-light-responsive photocatalytic product are glass, plastic, resin such as acryl, paper, fiber, metal, and wood. In particular, when the photocatalytic coating material is applied on glass, highly transparent glass whose light transmittance for light with a 550 nm wavelength is 50% or more is obtained. The reason for selecting the light with a 550 nm wavelength is that it is not absorbed by the tungsten oxide powder much and thus light transmittance of the photocatalytic coating layer itself can be measured.

The visible-light-responsive photocatalytic product according to this embodiment can be used as parts used in living space and in indoor space of automobiles. In particular, since automobiles use glass transmitting almost no ultraviolet, by using the visible-light-responsive photocatalytic product, it exhibits an effect for organic gas decomposition, hydrophilic property, stain-proofing, and so on in a space almost free from ultraviolet. The photocatalyst powder and the photocatalytic material are effectively used for a deodorizing antibacterial sheet, a shading cover, and the like for automobiles. Further, a coating layer of the photocatalyst powder or the photocatalytic material is also effective for bathroom glass, water tanks, vases, and so on.

Next, concrete examples of the visible-light-responsive photocatalytic product will be described. A cooking device (microwave oven or the like) includes a housing part provided inside a cabinet and a door provided on a front surface of the housing part. The housing part and the door form a heating chamber. On an inner surface side of the door, an inner barrier made of transparent glass is provided. The coating layer of the visible-light-responsive photocatalyst powder or photocatalytic material is provided on at least part of the heating chamber including an inner surface of the inner barrier (inner side of the heating chamber). The coating layer of the photocatalyst powder or the photocatalytic material exhibits the effect of deodorization, bacteria decomposition, and so on when irradiated with light of an inner lamp.

In a refrigerator, the visible-light-responsive photocatalyst powder or photocatalytic material is provided on at least part of members used in a storage chamber, such as a storage chamber inner wall, shelves, a water feed tank, an ice storage box. For example, in a case of a refrigerator including an auto icemaker, a water feed tank is made of transparent or translucent synthetic resin. The coating layer of the photocatalyst powder or the photocatalytic material is provided on an inner surface of the water feed tank. The coating layer of the photocatalyst powder or the photocatalytic material exhibits the effect of disinfecting a surface of the water feed tank, decomposing an organic compound in ice making water in the tank to purify water quality, and the like when irradiated with light of an inner lamp. Consequently, tasty ice free from smell can be made.

In an air-conditioner, the visible-light-responsive photocatalyst powder or photocatalytic material is used on at least part of a fin, a filter (especially, a filter for air-conditioner including a light source), an exterior material, and so on. For example, the coating layer of the photocatalyst powder or the photocatalytic material is provided on a surface of the fin, the filter, the exterior material, or the like. The coating layer of the photocatalyst powder or the photocatalytic material is excited by sunlight or visible light emitted from a light source to exhibit the effect of decomposing and removing a contaminant substance such as oil and smell adhering to the air-conditioner.

In an air cleaner and a dehumidifier, the visible-light-responsive photocatalyst powder or photocatalytic material is used on at least part of a filter (especially, a filter including a light source), an exterior material, and so on. For example, the coating layer of the photocatalyst powder or the photocatalytic material is provided on a surface of the filter or the exterior material. The coating layer of the photocatalyst powder or the photocatalytic material is excited by sunlight or visible light emitted from a light source to exhibit the effect of decomposing and removing a contaminant substance such as oil and smell adhering to the air cleaner or the dehumidifier. In an electric fan, the coating layer of the visible-light-responsive photocatalyst powder or the photocatalytic material is provided on a blade. The coating layer of the photocatalyst powder or the photocatalytic material exhibits the effect of decomposing and removing a contaminant substance such as oil and smell adhering to the electric fan.

In a fluorescent lamp and a desk lamp, the visible-light-responsive photocatalyst powder or photocatalytic material is used on at least part of a shade. For example, the coating layer of the photocatalyst powder or the photocatalytic material is provided on an inner surface or an outer surface of the shade. The coating layer of the photocatalyst powder or the photocatalytic material is excited by visible light emitted from the fluorescent lamp or the desk lamp to exhibit the effect of decomposing and removing a contaminant substance such as oil and smell adhering to the fluorescent lamp or the desk lamp. Further, owing to a stain-proofing effect by the photocatalyst powder or the photocatalytic material, the shade coated with the photocatalyst is difficult to get dirty and can be kept clean for a long time.

Building materials such as an interior wall material, a ceiling material, a partition, a blind, a paper sliding door, a paper panel door as the visible-light-responsive photocatalytic products each have the coating layer of the photocatalyst powder or the photocatalytic material. The coating layer of the photocatalyst powder or the photocatalytic material is excited by sunlight or visible light emitted from various kinds of light sources to exhibit the effect of decomposing and removing a contaminant substance such as oil and smell adhering to the interior wall material, the ceiling material, the partition, the blind, the paper sliding door, the paper panel door, and so on. Further, owing to a stain-proofing effect of the photo catalyst powder or the photocatalytic material, the effect that the building materials coated with the photocatalyst is difficult to get dirty is exhibited. The visible-light-responsive photocatalyst is also effective for slippers and a cabinet for them, a Christmas tree, and the like.

Fiber products using the visible-light-responsive photocatalyst include a curtain, a partition curtain, a uniform, and so on. The coating layer of the photocatalyst powder or the photocatalytic material is provided on surfaces of these fiber products. Alternatively, fiber in which the photocatalyst powder is mixed is used to make fiber products such as a curtain, a partition curtain, and a uniform. The photocatalyst powder or the photocatalytic material is excited by sun light or visible light emitted from various kinds of light sources to exhibit the effect of decomposing and removing a contaminant substance such as oil and smell adhering to the fiber products such as the curtain, the partition curtain, and the uniform. The visible-light-responsive photocatalyst is also effective for fiber products other than these.

Next, concrete examples of the present invention and the evaluation results thereof will be described.

Example 1

First, a tungsten trioxide powder whose average particle size was 0.5µ was prepared as a raw material powder. This raw material powder was sprayed to RFplasma together with carrier gas (Ar), and as reaction gas, argon and oxygen were supplied at flow rates of 40 L/min and 100 L/min respectively. A tungsten oxide powder was produced through a sublimation process in which an oxidation reaction of the raw material powder was caused while the raw material powder was being sublimated. Further, the tungsten oxide powder was heat-treated in the atmosphere under the condition of 700° C.×1 h. The production condition of the powder is shown in Table 1.

The obtained tungsten oxide powder was subjected to X-ray diffraction. For the X-ray diffraction, an X-ray diffraction instrument RINT-2000 manufactured by Rigaku Corporation was used, and a Cu target, a Ni filter, and a graphite (002) monochromator were used. Measuring conditions were as follows: tube/bulb voltage: 40 kV, tube/bulb current: 40 mA, divergent slit: ½°, scattering slit: auto, light-receiving slit: 0.15 mm, 2θ range measured: 20 to 70°, scanning speed: 0.5°/min, and sampling width: 0.004°. In measuring the peak intensities, Kα2 was not removed, and only smoothing and background subtraction processes were performed. For the smoothing, Savizky-Golay (least-squares method) was used and a filter point 11 was set. In the background subtraction, a straight line was fit in the measurement range and a threshold σ was set to 3.0. The result of the X-ray diffraction is shown in Table 2.

Further, regarding the obtained tungsten oxide powder, a BET specific surface area, an average particle size by image analysis of a TEM photo, L*a*b*, the nitrogen content, and the content of a metal element were measured. For measuring the BET specific surface area, a specific surface area measuring instrument Macsorb1201 manufactured by MOUNTECH Co., Ltd. was used. A pre-process was performed in nitrogen under the condition of 200°×20 minutes. For the TEM observation, H-7100FA manufactured by HITACHI was used, and an enlarged photo was subjected to image analysis and 50 particles or more were extracted, and D50 was calculated by finding a volume-based integrated diameter. For the L*a*b* measurement, a spectrophotometric colorimeter CM-2500d manufactured by KONICA MINOLTA was used. The measurement results of the BET specific surface area and the average particle size are shown in Table 2. The measurement results of the L*a*b*, the nitrogen content, and the metal element content are shown in Table 3.

Next, in order to evaluate photocatalytic performance of the obtained tungsten oxide powder, acetaldehyde decomposition performance was measured and evaluated. The acetaldehyde gas decomposition performance was evaluated by using a circulation type instrument as is used in the evaluation of nitrogen oxide removal performance (decomposition performance) of JIS-R-1701-1 (2004), under the following conditions. As a gas analyzing apparatus, a multi-gas monitor 1412 manufactured by INOVA was used. The evaluation result of photocatalytic performance is shown in Table 3. It was confirmed that the tungsten oxide powder according to the example 1 had a 52% gas residual ratio, which indicates high gas decomposition performance.

In the evaluation of the acetaldehyde gas decomposition performance, an initial concentration of acetaldehyde was 10 ppm, a gas flow rate was 140 mL/min, and an amount of a sample was 0.2 g. For the adjustment of the sample, it was applied on a 5×10 cm glass plate and was dried. In a case of a powder sample, it was spread by water to be dried. In a pre-process, 12-hour irradiation of black light was performed. As a light source, a fluorescent lamp (FL20SS•W/18 manufactured by Toshiba Lighting & Technology Corporation) was used, and wavelengths of 400 nm or lower were cut by an acrylic plate. Illuminance was 6000 lx. First, a waiting time without any light irradiation was continued until there occurred no gas absorption and the condition was stabilized. After the stabilization, the light irradiation was started. Under such conditions, the light was emitted and the gas concentration was measured 15 minutes later for finding the gas residual ratio. However, when the gas concentration was not stabilized even after 15 minutes passed, the light irradiation was continued until the stabilization, and the concentration was measured.

Comparative Example 1

The same measurement and evaluation as those of the example 1 were performed by using a tungsten oxide powder (manufactured by Rare Metallic Co., Ltd.) available on the market as a reagent. The measurement and evaluation results are shown in Table 2 and Table 3. An X-ray diffraction result of the tungsten oxide powder of the comparative example 1 is shown in FIG. 1. When peak intensity ratios were found from the X-ray diffraction result, an A/D ratio was 0.96, a B/D ratio was 0.96, a C/D ratio was 0.03, an E/F ratio was 0.15, and a G/H ratio was 0.03. A BET specific surface area was 0.7 m$^2$/g and an average particle size was 1210 nm. It was confirmed that the tungsten oxide powder of the comparative example 1 had poor gas decomposition performance (gas residual ratio) of 97% because its peak intensity ratios and BET specific surface area based on the X-ray diffraction result did not reach the values defined in the present invention.

Example 2

A tungsten oxide powder was produced through the same sublimation process as that of the example 1 except in that oxygen was supplied as reaction gas at a flow rate of 80 L/min. However, heat treatment was not performed. The tungsten oxide powder thus obtained was subjected to the same measurement and evaluation as those of the example 1. The production condition of the tungsten oxide powder is shown in Table 1 and the measurement and evaluation results are shown in Table 2 and Table 3. It was confirmed that the tungsten oxide powder according to the example 2 exhibited excellent gas decomposition performance.

Examples 3 to 5

In examples 3 to 5, the same sublimation process as that of the example 1 was performed. In the example 3, as reaction gas, argon was supplied at a flow rate of 40 L/min and air was supplied at a flow rate of 40 L/min in the sublimation process, and a heat treatment process was performed under the condition of 600°×1 h after the sublimation process. In the example 4, as reaction gas, argon was supplied at a flow rate of 40 L/min and oxygen was supplied at a flow rate of 40 L/min in the sublimation process, and a heat treatment process was performed under the condition of 500°×0.5 h after the sublimation process. In the example 5, the sublimation process and the heat treatment process were performed under the same conditions as those of the example 3 except in that, as a raw material injected into plasma, a tungsten oxide powder containing a large amount of impurity elements such as Fe and Mo was used.

Figure 6:
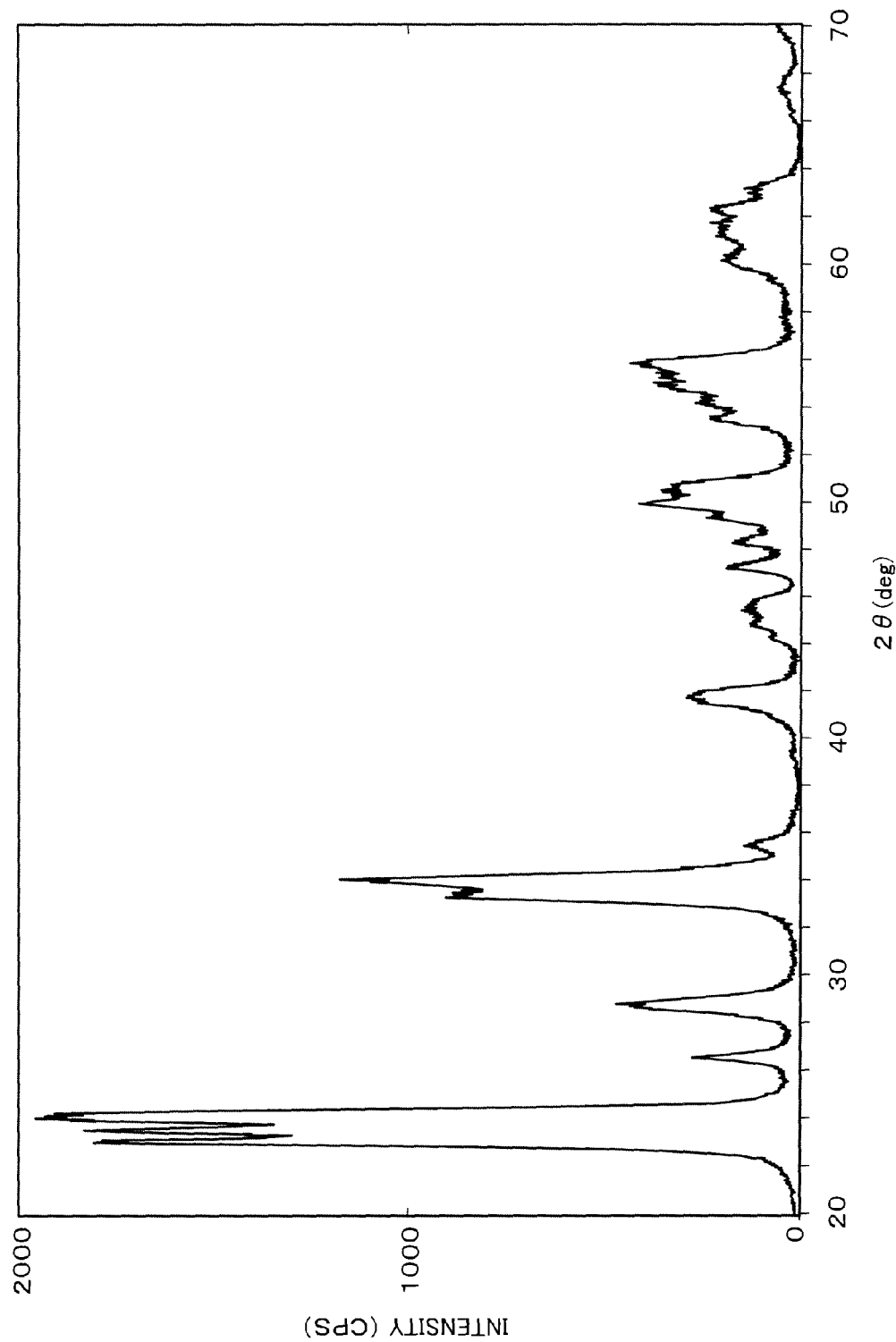
FIG. 6 is a chart showing the result of X-ray diffraction of a tungsten oxide powder according to an example 4.

The obtained tungsten oxide powder was subjected to the same measurement and evaluation as those of the example 1. The production conditions of the tungsten oxide powders are shown in Table 1 and the measurement and evaluation results are shown in Table 2 and Table 3. As for the example 4, the result of X-ray diffraction is shown in FIG. 6. It was confirmed that the tungsten oxide powders according to the examples 3 to 5 all exhibited good gas decomposition performance.

Example 6

A tungsten oxide powder was produced in the same manner as that of the example 1 except in that, as reaction gas, argon was supplied at a flow rate of 80 L/min and air was supplied at a flow rate of 5 L/min, and the pressure in a reaction vessel was adjusted to a pressure-reduced side of 35 kPa. Heat treatment was not performed. The tungsten oxide powder obtained was subjected to the same measurement and evaluation as those of the example 1. The production condition of the tungsten oxide powder is shown in Table 1 and the measurement and evaluation results are shown in Tables 2 and 3.

Though peak intensity ratios and a BET specific surface area based on the X-ray diffraction result satisfied predetermined values, it was confirmed that b* of the L*a*b* color system was low, namely, −10.2 and L* was also low, namely, 48.9. Therefore, it was confirmed that gas decomposition performance (gas residual ratio) of the tungsten oxide powder was 80% which is slightly lower than that of the example 1.

Example 7

A tungsten oxide powder was produced through the same sublimation process as that of the example 1 except in that, as reaction gas, argon was supplied at a flow rate of 80 L/min, oxygen was supplied at a flow rate of 5 L/min, and nitrogen was supplied at a flow rate of 40 L/min. The obtained powder was subjected to heat treatment in the atmosphere under the condition of 700°×0.25 h. The tungsten oxide powder thus obtained was subjected to the same measurement and evaluation as those of the example 1. The production condition of the tungsten oxide powder is shown in Table 1 and the measurement and evaluation results are shown in Table 2 and Table 3.

Though peak intensity ratios and a BET specific surface area based on the X-ray diffraction result satisfied predetermined values, it was confirmed that gas decomposition performance (gas residual ratio) was 65% which is slightly lower than that of the example 1, due to a high nitrogen content of 450 ppm. It is thought that this is because the high nitrogen content causes the distortion in crystal lattice.

Comparative Example 2

A tungsten oxide powder produced through the same sublimation process as that of the example 4 was subjected to heat treatment in the atmosphere under the condition of 1100°×0.5 h. The tungsten oxide powder thus obtained was subjected to the same measurement and evaluation as those of the example 1. The production condition of the tungsten oxide powder is shown in Table 1 and the measurement and evaluation results are shown in Table 2 and Table 3. The tungsten oxide powder had a small BET specific surface area of 1.4 m$_2$/g and a large average particle size of 605 nm. It was confirmed that gas decomposition performance thereof was low as a result. It is thought that this is because particle growth occurred by the high-temperature heat treatment.

Example 8

A pellet of a tungsten oxide powder whose density was 4.5 g/cm$^3$ was prepared as a raw material. This raw material (pellet) was put in a reaction vessel and an arc discharge process was performed at a 5 kPa pressure. The tungsten oxide powder produced by the arc discharge process was subjected to heat treatment in the atmosphere under the condition of 650°×1 h. The tungsten oxide powder thus obtained was subjected to the same measurement and evaluation as those of the example 1. The production condition of the tungsten oxide powder is shown in Table 1 and the measurement and evaluation results are shown in Table 2 and Table 3. It was confirmed that the tungsten oxide powder of the example 8 exhibited the same level of gas decomposition performance as that of the example 1.

Example 9

A pellet of a tungsten oxide powder whose density was 4.5 g/cm$^3$ was prepared as a raw material. This raw material (pellet) was put in a reaction vessel and was irradiated with a Co$_2$ laser while oxygen was supplied at a flow rate of 10 L/min and the pressure was kept at 3 kPa. The tungsten oxide powder produced by the laser process was subjected to heat treatment in the atmosphere under the condition of 650°×1 h. The tungsten oxide powder thus obtained was subjected to the same measurement and evaluation as those of the example 1. The production condition of the tungsten oxide powder is shown in Table 1 and the measurement and evaluation results are shown in Table 2 and Table 3. It was confirmed that the tungsten oxide powder of the example 9 exhibited the same level of gas decomposition performance as that of the example 1. The same result was obtained when an electron beam irradiation process was applied.

Example 10

As a raw material, an ammonium tungstate solution whose WO$_3$ purity was 30% was prepared. This raw material (solution) together with 100 L/min oxygen was sprayed to flame of an acetylene gas burner in a reaction vessel, whereby a tungsten oxide powder was produced. Further, the tungsten oxide powder was subjected to heat treatment in the atmosphere under the condition of 650°×0.5 h. The tungsten oxide powder thus obtained was subjected to the same measurement and evaluation as those of the example 1. The production condition of the tungsten oxide powder is shown in Table 1 and the measurement and evaluation results are shown in Tables 2 and 3. It was confirmed that the tungsten oxide powder of the example 10 exhibited the same level of gas decomposition performance as that of the example 1.

TABLE 1

| | production condition | | | |
|---|---|---|---|---|
| | sublimation process | | heat-treatment process | |
| | raw material | method | temperature (° C.) | hour (h) |
| Example 1 | WO$_3$ | plasma | 700 | 1 |
| Example 2 | WO$_3$ | plasma | — | — |
| Example 3 | WO$_3$ | plasma | 600 | 1 |
| Example 4 | WO$_3$ | plasma | 500 | 0.5 |
| Example 5 | WO$_3$ | plasma | 600 | 1 |
| Example 6 | WO$_3$ | plasma | — | — |
| Example 7 | WO$_3$ | plasma | 700 | 0.25 |
| Example 8 | WO$_3$ | arc discharge | 650 | 1 |
| Example 9 | WO$_3$ | laser | 650 | 1 |
| Example 10 | WO$_3$ | gas burner | 650 | 0.5 |
| comparative example 1 | — | — | — | — |
| comparative example 2 | WO$_3$ | plasma | 1100 | 0.5 |

TABLE 2

| | powder property 1 | | | | | | |
|---|---|---|---|---|---|---|---|
| | X-ray diffraction result | | | | | BET specific surface area [m$^2$/g] | average particle size [nm] |
| | 2θ = 22.5~25° | | | 2θ = 33~35° | 2θ = 49~51° | | |
| | A/D ratio | B/D ratio | C/D ratio | E/F ratio | G/H ratio | | |
| Example 1 | 1.08 | 1.04 | 0.11 | 0.31 | 0.06 | 17 | 49.8 |
| Example 2 | 1.52 | 1.23 | 2.18 | 1.24 | 1.43 | 101 | 8.5 |
| Example 3 | 1.02 | 0.94 | 0.78 | 0.70 | 0.40 | 35 | 24.4 |
| Example 4 | 0.93 | 0.95 | 1.01 | 0.94 | 0.58 | 58 | 14.4 |
| Example 5 | 0.97 | 0.96 | 0.98 | 0.90 | 0.62 | 37 | 23.9 |
| Example 6 | 1.20 | 1.10 | 0.63 | 0.78 | 0.25 | 87 | 10.1 |
| Example 7 | 0.97 | 1.00 | 0.52 | 0.61 | 0.21 | 30 | 28.5 |
| Example 8 | 0.99 | 1.00 | 0.19 | 0.33 | 0.11 | 15 | 55.5 |
| Example 9 | 0.98 | 0.97 | 0.22 | 0.41 | 0.25 | 19 | 45.1 |
| Example 10 | 1.02 | 0.99 | 0.30 | 0.39 | 0.16 | 16 | 53.3 |
| comparative example 1 | 0.96 | 0.96 | 0.03 | 0.15 | 0.03 | 0.7 | 1210 |
| comparative example 2 | 1.08 | 0.93 | 0.05 | 0.13 | 0.04 | 1.4 | 605 |

TABLE 3

| | powder property 2 | | | | | evaluation result gas decomposition performance |
|---|---|---|---|---|---|---|
| | L*a*b* | | | N content | metal | |
| | a* | b* | L* | [ppm] | content | (residual ratio) [%] |
| Example 1 | −3.9 | 30.0 | 82.3 | <10 | <10 ppm | 52 |
| Example 2 | −11.0 | 10.0 | 80.5 | 70 | <10 ppm | 38 |
| Example 3 | −11.5 | 23.8 | 90.4 | 15 | <10 ppm | 15 |
| Example 4 | −10.0 | 20.0 | 92.0 | <10 | <10 ppm | 10 |
| Example 5 | −9.6 | 26.4 | 91.3 | <10 | Fe 25 ppm Mo 20 ppm | 21 |
| Example 6 | −5.2 | −10.2 | 48.9 | 290 | <10 ppm | 80 |
| Example 7 | −10.2 | −2.2 | 66.7 | 450 | <10 ppm | 65 |
| Example 8 | −5.5 | 25.4 | 80.4 | 20 | <10 ppm | 50 |
| Example 9 | −4.3 | 28.8 | 78.7 | 10 | <10 ppm | 53 |
| Example 10 | −3.2 | 20.9 | 81.0 | 300 | <10 ppm | 49 |
| comparative example 1 | −16.2 | 48.1 | 88.8 | <10 | <10 ppm | 97 |
| comparative example 2 | −15.7 | 43.5 | 85.1 | <10 | <10 ppm | 91 |

Example 11

A copper oxide (CuO) powder at a ratio of 2 mass % was mixed in the tungsten oxide powder obtained in the example 3. The tungsten oxide powder thus obtained was subjected to the same evaluation of gas decomposition performance as that of the example 1. The gas decomposition performance (gas residual ratio) was 14% and it was confirmed that high performance on the same level as that of the example 3 was exhibited.

Example 12

A water-type coating material containing 5 mass % of the tungsten oxide powder produced in the example 4 and 0.05 mass % of colloidal silica was prepared. This was applied on glass to be dried, whereby glass having a photocatalytic coating layer was fabricated. When gas decomposition performance of this glass was evaluated according to the aforesaid method, it was confirmed that it had an excellent gas residual ratio of 20%. Next, transmittance of the glass having the photocatalytic coating layer when it was irradiated with light with a 550 nm wavelength was measured. For the measurement of the light transmittance, a UV-Vis spectrophotometer UV-2550 manufactured by Shimazu Corporation was used. As a result, the light transmittance was 90% when the film thickness was 0.25 μm.

Further, when the aforesaid coating material was applied on glass in an indoor space of an automobile, smell of cigarette was reduced and the glass was not easily stained. Incidentally, when a hydrophilic property of the glass coated with the coating material was evaluated, a contact angle was 1° or less and an ultrahigh hydrophilic property was exhibited. Further, when antibacterial performance was evaluated by using *Staphylococcus aureus*, colon *bacillus*, and mold, it was confirmed that excellent antibacterial performance was exhibited against any of them. The visible-light-responsive photocatalyst powder of the example is excellent in acetaldehyde decomposition performance, or the photocatalytic coating layer has high transmittance and is unlikely to have a visual problem such as uneven color. Therefore, they are suitably used for members used in an indoor space of an automobile, building materials, and so on.

INDUSTRIAL APPLICABILITY

The visible-light-responsive photocatalyst powder according to the aspect of the present invention is excellent in photocatalytic performance and its stability owing to its crystal structure and specific surface area. Therefore, applying such a visible-light-responsive photocatalyst powder makes it possible to provide a visible-light-responsive photocatalytic material, photocatalytic coating material and photocatalytic product each excellent in photocatalytic performance by visible light and its reproducibility.

What is claimed is:

1. A visible-light-responsive photocatalyst powder comprising:
   a tungsten oxide powder having a BET specific surface area in a range of 1.5 to 820 m$^2$/g,
   wherein the tungsten oxide powder has a crystal structure in which a rhombic crystal is mixed with at least one selected from a monoclinic crystal and a triclinic crystal,
   wherein when the tungsten oxide powder is measured by X-ray diffractometry,
   (1) the tungsten oxide powder has first, second, and third peaks in 22.5 to 25° of 2θ range, and an intensity ratio of a peak A to a peak D (A/D) and an intensity ratio of a peak B to the peak D (B/D) each fall within a range of 0.5 to 2.0, and an intensity ratio of a peak C to the peak D (C/D) falls within a range of 0.63 to 2.5, where the peak A is a peak existing in 22.8 to 23.4° of 2θ range, the peak B is a peak existing in 23.4 to 23.8° of 2θ range, the peak C is a peak existing in 24.0 to 24.25° of 2θ range, and the peak D is a peak existing in 24.25 to 24.5° of 2θ range,
   (2) an intensity ratio of a peak E to a peak F (E/F) falls within a range of 0.1 to 2.0, where the peak E is a peak existing in 33.85 to 34.05° of 2θ range and the peak F is a peak existing in 34.05 to 34.25° of 2θ range, and
   (3) an intensity ratio of a peak G to a peak H (G/H) falls within a range of 0.04 to 2.0, where the peak G is a peak existing in 49.1 to 49.7° of 2θ range and the peak H is a peak existing in 49.7 to 50.3° of 2θ range,
   wherein a nitrogen content in the tungsten oxide powder is 300 ppm or less, and
   wherein the tungsten oxide powder is photocatalytic when irradiated with visible.

2. The visible-light-responsive photocatalyst powder according to claim 1, wherein the intensity ratio (A/D) of the peak A to the peak D and the intensity ratio (B/D) of the peak B to the peak D each fall within a range of 0.7 to 2.0, the intensity ratio (C/D) of the peak C to the peak D falls within a range of 0.63 to 2.5, the intensity ratio (E/F) of the peak E to the peak F falls within a range of 0.5 to 2.0, and the intensity ratio (G/H) of the peak G to the peak H falls within a range of 0.2 to 2.0.

3. The visible-light-responsive photocatalyst powder according to claim 1,
wherein the intensity ratio (A/D) of the peak A to the peak D and the intensity ratio (B/D) of the peak B to the peak D each fall within a range of 0.7 to 1.5, the intensity ratio (C/D) of the peak C to the peak D falls within a range of 0.63 to 1.5, the intensity ratio (E/F) of the peak E to the peak F falls within a range of 0.5 to 1.5, and the intensity ratio (G/H) of the peak G to the peak H falls within a range of 0.2 to 1.5.

4. The visible-light-responsive photocatalyst powder according to claim 1,
wherein the tungsten oxide powder has the BET specific surface area in a range of 11 to 300 m$^2$/g.

5. The visible-light-responsive photocatalyst powder according to claim 1,
wherein the tungsten oxide powder has the BET specific surface area in a range of 16 to 150 m$^2$/g.

6. The visible-light-responsive photocatalyst powder according to claim 1,
wherein an average particle size (D50) by image analysis of the tungsten oxide powder falls within a range of 1 to 548 nm.

7. The visible-light-responsive photocatalyst powder according to claim 1,
wherein an average particle size (D50) by image analysis of the tungsten oxide powder falls within a range of 2.7 to 75 nm.

8. The visible-light-responsive photocatalyst powder according to claim 1,
wherein an average particle size (D50) by image analysis of the tungsten oxide powder falls within a range of 5.5 to 51 nm.

9. The visible-light-responsive photocatalyst powder according to claim 1,
wherein the tungsten oxide powder has color whose a* is 0 or less, b* is −5 or more, and L* is 50 or more when the color of the powder is expressed by an L*a*b* color system.

10. The visible-light-responsive photocatalyst powder according to claim 1,
wherein the tungsten oxide powder has color whose a* is −5 or less, b* is 5 or more, and L* is 70 or more when the color of the powder is expressed by an L*a*b* color system.

11. The visible-light-responsive photocatalyst powder according to claim 1,
wherein a content of a metal element as an impurity element in the tungsten oxide powder is 10 mass % or less.

12. The visible-light-responsive photocatalyst powder according to claim 1,
wherein the tungsten oxide powder contains a transition metal element in a range of 50 mass % or less.

13. A visible-light-responsive photocatalyst powder comprising:
a tungsten oxide powder having an average particle size (D50) by image analysis in a range of 1 to 548 nm,
wherein the tungsten oxide powder has a crystal structure in which a rhombic crystal is mixed with at least one selected from a monoclinic crystal and a triclinic crystal,
wherein when the tungsten oxide powder is measured by X-ray diffractometry,
(1) the tungsten oxide powder has first, second, and third peaks in 22.5 to 25° of 2θ range, and an intensity ratio of a peak A to a peak D (A/D) and an intensity ratio of a peak B to the peak D (B/D) each fall within a range of 0.5 to 2.0, and an intensity ratio of a peak C to the peak D (C/D) falls within a range of 0.63 to 2.5, where the peak A is a peak existing in 22.8 to 23.4° of 2θ range, the peak B is a peak existing in 23.4 to 23.8° of 2θ range, the peak C is a peak existing in 24.0 to 24.25° of 2θ range, and the peak D is a peak existing in 24.25 to 24.5° of 2θ range,
(2) an intensity ratio of a peak E to a peak F (E/F) falls within a range of 0.1 to 2.0, where the peak E is a peak existing in 33.85 to 34.05° of 2θ range and the peak F is a peak existing in 34.05 to 34.25° of 2θ range, and
(3) an intensity ratio of a peak G to a peak H (G/H) falls within a range of 0.04 to 2.0, where the peak G is a peak existing in 49.1 to 49.7° of 2θ range and the peak H is a peak existing in 49.7 to 50.3° of 2θ range,
wherein a nitrogen content in the tungsten oxide powder is 300 ppm or less, and
wherein the tungsten oxide powder is photocatalytic when irradiated with visible light.

14. The visible-light-responsive photocatalyst powder according to claim 13,
wherein the average particle size (D50) by the image analysis of the tungsten oxide powder falls within a range of 2.7 to 75 nm.

15. The visible-light-responsive photocatalyst powder according to claim 13,
wherein the average particle size (D50) by the image analysis of the tungsten oxide powder falls within a range of 5.5 to 51 nm.

16. The visible-light-responsive photocatalyst powder according to claim 13,
wherein the tungsten oxide powder has color whose a* is 0 or less, b* is −5 or more, and L* is 50 or more when the color of the powder is expressed by an L*a*b* color system.

17. The visible-light-responsive photocatalyst powder according to claim 13,
wherein a content of a metal element as an impurity element in the tungsten oxide powder is 10 mass % or less.

18. The visible-light-responsive photocatalyst powder according to claim 13,
wherein the tungsten oxide powder contains a transition metal element in a range of 50 mass % or less.

19. A visible-light-responsive photocatalytic material containing the visible-light-responsive photocatalyst powder according to claim 1 in a range of not less than 1 mass % nor more than 100 mass %.

20. A visible-light-responsive photocatalytic coating material containing the visible-light-responsive photocatalytic material according to claim 19 in a range of not less than 0.1 mass % nor more than 90 mass %.

21. A visible-light-responsive photocatalytic product comprising the visible-light-responsive photocatalytic material according to claim 19.

22. The visible-light-responsive photocatalytic product according to claim 21,
wherein the product is fiber or glass containing the visible-light-responsive photocatalytic material.

23. A visible-light-responsive photocatalytic product comprising a coating layer of the visible-light-responsive photocatalytic coating material according to claim 20.

24. The visible-light-responsive photocatalytic product according to claim 23,
wherein the product is fiber or glass having the coating layer of the visible-light-responsive photocatalytic coating material.

25. The visible-light-responsive photocatalytic product according to claim 24,
wherein the glass coated with the visible-light-responsive photocatalytic coating material has a light transmittance of 50% or more for 550 nm of wavelength.

26. The visible-light-responsive photocatalytic product according to claim 23,
wherein the product is configured to be disposed in an indoor space of an automobile.

27. A visible-light-responsive photocatalytic product comprising the visible-light-responsive photocatalyst powder according to claim 13.

28. A visible-light-responsive photocatalytic product comprising a coating layer of a photocatalytic coating material containing the visible-light-responsive photocatalyst powder according to claim 13.

* * * * *